United States Patent
Huang et al.

(10) Patent No.: US 9,529,833 B2
(45) Date of Patent: Dec. 27, 2016

(54) GRAPH PRUNING IN HIPERGRAPH

(71) Applicant: Palo Alto Research Center Incorporated, Palo Alto, CA (US)

(72) Inventors: Eric Huang, San Francisco, CA (US); Rong Zhou, San Jose, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 232 days.

(21) Appl. No.: 14/184,270

(22) Filed: Feb. 19, 2014

(65) Prior Publication Data
US 2015/0234875 A1 Aug. 20, 2015

(51) Int. Cl.
*G06F 17/30* (2006.01)
*G06Q 30/02* (2012.01)

(52) U.S. Cl.
CPC ..... *G06F 17/30324* (2013.01); *G06Q 30/0251* (2013.01)

(58) Field of Classification Search
CPC ............... G06Q 30/00; G06Q 30/0215; G06F 17/30324
See application file for complete search history.

(56) References Cited

U.S. PATENT DOCUMENTS

| | | | | | |
|---|---|---|---|---|---|
| 5,701,460 | A * | 12/1997 | Kaplan | ............ | G06F 17/30436 707/748 |
| 7,716,229 | B1 * | 5/2010 | Srivastava | ............ | G06Q 30/02 707/737 |
| 7,818,272 | B1 * | 10/2010 | Mishra | ................ | G06K 9/6224 706/14 |
| 8,533,182 | B1 * | 9/2013 | Charboneau | ...... | G06F 17/30979 707/718 |
| 8,645,429 | B1 * | 2/2014 | Bik | .................. | G06F 17/30958 707/797 |
| 2002/0116357 | A1 * | 8/2002 | Paulley | ............ | G06F 17/30466 |
| 2004/0267686 | A1 * | 12/2004 | Chayes | ............... | G06F 17/3071 |
| 2006/0224562 | A1 * | 10/2006 | Yan | ........................ | G06F 19/705 |
| 2007/0239694 | A1 * | 10/2007 | Singh | ............... | G06F 17/30958 |
| 2008/0133187 | A1 * | 6/2008 | Smith | .................... | G06F 17/50 703/2 |
| 2009/0327260 | A1 * | 12/2009 | Li | ..................... | G06F 17/30672 |

(Continued)

OTHER PUBLICATIONS

Tarjan, Robert, "Depth-First Search and Linear Graph Algorithms", SIAM Journal on Computing, vol. 1, No. 2, Jun. 1972.

*Primary Examiner* — Shiow-Jy Fan
(74) *Attorney, Agent, or Firm* — Shun Yao; Park, Vaughan, Fleming & Dowler LLP

(57) ABSTRACT

One embodiment of the present invention provides a system for graph pruning. During operation, the system identifies a connected component in a graph comprising one or more vertices. A respective vertex of the graph represent an element in a data set, an edge between two vertices represents a type and strength of relationship between the vertices. The system identifies a connected component to be smaller than a minimum graph traversal threshold associated with a query for the graph. This minimum graph traversal threshold indicates a minimum number of traversal steps needed for the query. The system then generates a second graph by pruning the connected component from the graph. This second graph is processed to extract information of interest from the data set.

20 Claims, 9 Drawing Sheets

(56) References Cited

U.S. PATENT DOCUMENTS

| | | | | |
|---|---|---|---|---|
| 2011/0131253 A1* | 6/2011 | Peukert | ............ | G06F 17/30292 |
| | | | | 707/805 |
| 2014/0019490 A1* | 1/2014 | Roy | ................. | G06F 17/30073 |
| | | | | 707/798 |
| 2015/0003322 A1* | 1/2015 | Pyattaev | ........... | H04W 28/0221 |
| | | | | 370/328 |

* cited by examiner

GRAPH PRUNING IN HIPERGRAPH

BACKGROUND

Field

The present disclosure relates to graph analytics. More specifically, this disclosure relates to a method and system for pruning graph representation for facilitating efficient processing of graph data.

Related Art

The exponential growth of computing power has made it possible to extract information of interest, such as shopping preferences and/or recommendations, social media activities, medical referrals, and e-mail traffic patterns, using efficient data analysis. Such data analysis requirements have brought with them an increasing demand for efficient computation. As a result, equipment vendors race to build larger and faster computing devices with versatile capabilities, such as graph analysis, to calculate information of interest efficiently. However, the computing capability of a computing device cannot grow infinitely. It is limited by physical space, power consumption, and design complexity, to name a few factors. Furthermore, computing devices with higher capability are usually more complex and expensive. More importantly, because an overly large and complex computing device often does not provide economy of scale, simply increasing the capability of a computing device may prove economically unviable.

One way to meet this challenge is to increase the efficiency of data analysis tools used for extracting information of interest from a large data set. Hipergraph is a high-performance graph analytics engine that performs very fast queries on graph data. Graph data is data that can be easily represented by a graph. A graph is a set of vertices with edges that connect them. Hipergraph requires the input to be in a very specific format, but formatting many real-world graph datasets is non-trivial because the formatting operations exceed the typical memory and disk capacities of a single machine.

In one approach, one can perform automated compilation and formatting of data using scripts and UNIX utilities. This approach works relatively well when the inputs and output files and intermediary computation fit on a modern workstation. However, when the input graph dataset is on the order of several hundred gigabytes, one cannot even sort the data on a standard machine because of the time, disk space, and memory space required.

SUMMARY

One embodiment of the present invention provides a system for graph pruning. During operation, the system identifies a connected component in a graph comprising one or more vertices. A respective vertex of the graph represent an element in a data set, an edge between two vertices represents a type and strength of relationship between the vertices. The system identifies a connected component to be smaller than a minimum graph traversal threshold associated with a query for the graph. This minimum graph traversal threshold indicates a minimum number of traversal steps needed for the query. The system then generates a second graph by pruning the connected component from the graph. This second graph is processed to extract information of interest from the data set.

In a variation on this embodiment, a connected component includes one or more of: (i) an isolated vertex; and (ii) a set of vertices coupled to each other via one or more edges, wherein the vertices are not coupled to a vertex outside of the set.

In a variation on this embodiment, a respective element, which is identified based on a first identifier, in the data set is stored on one or more tables. To identify a connected component to be smaller than a minimum graph traversal threshold, the system performs one or more tabular operations on the one or more tables.

In a further variation, in response to identifying an element not to be represented by a connected component, the system generates a second identifier for the element.

In a further variation, the system maps the second identifier to the first identifier in a mapping table.

In a variation on this embodiment, the system assigns a label to a respective vertex in the graph, propagates a label from a first vertex to a second vertex, and identifies a set of vertices associated with the same label.

In a further variation, to identify a connected component to be smaller than a minimum graph traversal threshold, the system determines whether the set of identified set of vertices is smaller than the minimum graph traversal threshold.

In a variation on this embodiment, an element in the data set corresponds to one or more of: (i) a customer of a store; and (ii) a product of the store. The type of relationship indicates whether the customer has purchased the product.

BRIEF DESCRIPTION OF THE FIGURES

In the figures, like reference numerals refer to the same figure elements.

DETAILED DESCRIPTION

Figure 1:
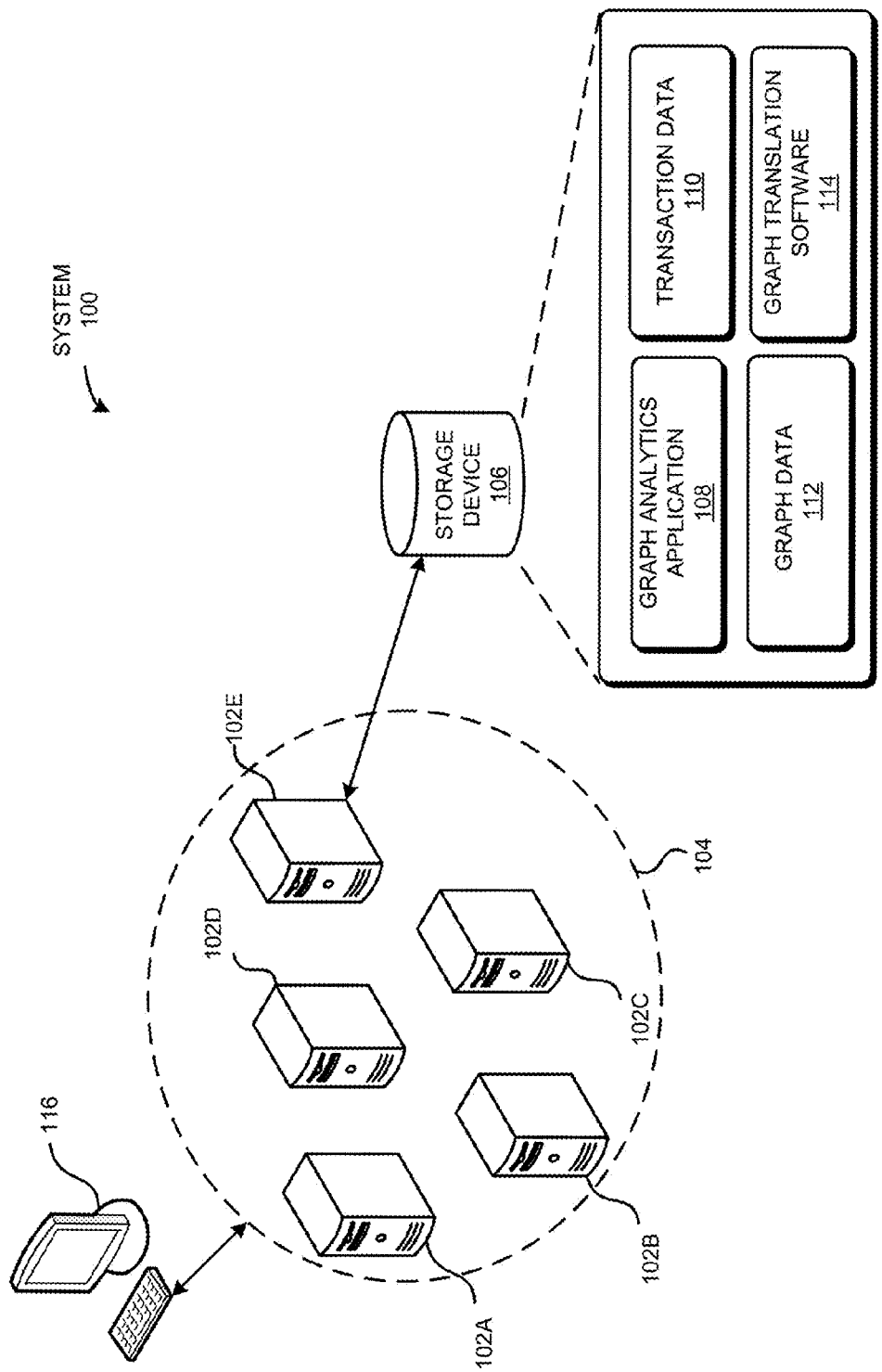
FIG. 1 illustrates an exemplary architecture of a graph pruning system, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of efficient data processing from a graph by pruning a graph based on a minimum graph traversal threshold. Typically, to extract information of interest from a graph, a graph analytics system (e.g., Hipergraph), which can be an apparatus and/or a software application, traverses a graph (e.g., traverses one or more vertices and/or edges of the graph). Examples of information of interest include, but are not limited to, shopping preferences and/or recommendations, social media activities, medical referrals, and e-mail traffic patterns.

Extracting the information of interest from a graph often involves applying queries comprising a minimum number of graph traversal steps (e.g., comprises a traversal at least through a minimum number of vertices and/or edges), which can be referred to as a minimum graph traversal threshold. Often the input graph to the graph analytics system is sparse comprising isolated sets of vertices and edges that do not interconnect with the rest of the graph. These isolated sets can be referred to as connected components. In other words, a connected component can include an isolated vertex and/or a set of vertices coupled to each other via edges, wherein the vertices in the set are not coupled to a vertex outside of the set.

If a query for the graph involves a minimum graph traversal threshold, traversing through connected components smaller than the minimum graph traversal threshold does not yield any information of interest. As a result, traversing though the vertices and/or edges of these connected components increases processing time and memory requirement for the graph analytics system without producing the intended information of interest from the graph.

To solve this problem, the graph analytics system can prune (e.g., discard) the connected components (e.g., corresponding set of the vertices and/or edges) which do not meet this minimum graph traversal threshold from the graph for a more efficient data processing from the graph. The graph analytics system usually receives a generated graph data as input from a graph translation system, which extracts data from a data source, such as a relational table storing various types of data. The graph translation system processes and projects the data into intermediate tables, generates headers, and then writes the tables, headers, and additional tables with data describing a graph topology and associated edge attribute data into a suitably formatted text file. Generally, graph operations on a smaller graph yields better performance and has a smaller memory and processing requirements. If a batch of similar queries, which can have different starting points in the graph, are applied to the graph a plurality of times, pruning the graph prior to making the batch of queries significantly reduces the overall computation time.

The system may utilize the techniques disclosed herein to provide recommendations to a customer. A retailer may sell products to customers, and in order to provide recommendations to customers, the system may process graph data, which can provide an analysis of customer transaction data, including purchase data. The system may examine a customer's purchase item, and then identify products purchased by other customers who also purchased the same product as the first customer. The system may then recommend a product to the first customer from the identified products. The customer transaction data may be mixed with other data and stored in a relational database (or some other format unsuitable for direct input to Hipergraph). Suppose that vertices of the graph represent customers and products, and an edge between two vertices indicates whether a customer has purchased a product.

In some embodiments, a query for recommending a product to the first customer includes finding other customers which have purchased at least one product in common with first customer and identifying products these other customers have purchased. Based on the graph model, such a computation requires a minimum graph traversal of four vertices (e.g., three edges). The first traversal step is from the vertex representing the first customer to a second set of vertices representing the set of products that the first customer has purchased. A second step involves traversing from respective vertices in the second set of vertices to a third set of vertices representing other customers who have purchased these purchased products. A third step is traversing from the third set of vertices to the vertices representing other purchases made by the other customers. The graph analytics system can prune out connected components comprising edges less than three from the original input graph. The pruned graph can be then used to answer the query. The answer produces the same result as that of the original graph with faster processing and a lower memory requirement.

Although examples are discussed herein with respect to Hipergraph, embodiments of the present invention may apply the disclosed techniques with any graph analytics application. In this disclosure, the terms "application" and "software" are used interchangeably. Some embodiments may utilize a relational interface, such as HBase or SQL, instead of Hive. Some of the scripts may be written in C/C++ or other scripting languages, or standard UNIX scripting programs such as cat, join, paste, cut, and sort.

System Architecture

FIG. 1 illustrates an exemplary architecture of a graph pruning system, in accordance with an embodiment of the present invention. A graph processing system 100 may extract data stored according to a relational model (or any other data model) and translate the data to a suitable format representing a graph. The translated data should be appropriate for input to a graph analytics application (e.g., Hipergraph). The graph analytics application prune the graph based on a minimum graph traversal threshold. Operation of a high-performance graph analytics application is specified in U.S. patent application Ser. No. 14/039,941, titled "System and Method for a High-Performance Graph Analytics Engine," by inventors Rong Zhou and Daniel Davies, filed 27 Sep. 2013, the disclosure of which is incorporated herein in its entirety.

In some embodiments, system 100 can include a set of servers 102A-102E executing as part of a cluster 104. Each of the servers 102A-102E may include a software and data stored on a storage device. For example, server 102E may include a storage device 106. Storage device 106 may store data and software such as graph analytics application 108 (e.g., Hipergraph), transaction data 110, graph data 112, and graph translation software 114. Some implementations may also include a client 116 communicating with servers in cluster 104 to request graph translation services associated with Hipergraph. Note that different implementations of the present invention may include any number of servers and storage devices. Various inventive aspects of system 100 are further described below.

In some embodiments, graph analytics application 108 accepts its input as a text file formatted in a specific way, with certain constraints and formatting requirements. The input text file should include a description of a graph and other associated data, including the graph topology and data associated with vertices. The graph structure data should be separated from data describing attributes of the vertices and edges. For collaborative filtering, vertices represent customers or products, while edges represent purchase transactions.

In some embodiments, system 100 utilizes data warehousing software such as Hive built on top of Hadoop. Hive is a data warehouse system for Hadoop. Hive facilitates easy data summarization, ad-hoc queries, and the analysis of large datasets residing in distributed storage with Hadoop-compatible file systems. Hive provides a SQL interface to access the stored data. Hadoop is the storage layer. Hadoop is a framework for the distributed processing of large data sets across clusters of machines, pulling together the machines' and CPU power. Hadoop provides for storage of data across the clusters, and allows for scaling from a single server to thousands of machines. It provides a scalable distributed file system that spans all the nodes in the clusters. Retailers may store hundreds of gigabytes of data in a Hadoop cluster. One may use Hive with Hadoop and Bash scripting in order to automatically compile data from typical relational database tables into a format appropriate for Hipergraph. Bash is a Unix shell. Bash can read commands from a script file and execute the commands within the script.

The input to the Hipergraph of graph analytics application 108 is a set of tables and headers generated with Hive. In some implementations, one can execute SQL scripts in Hive to project customer, product, and transaction data from a main table to smaller intermediate tables. For example, in a retail database, there may be a main table where one column stores customer identifiers (IDs,) and another column stores the product ID for a purchase that the customer made. Other columns in this main table may store a transaction ID and the date of such a transaction. The intermediate tables generated by Hive may be written to storage in the form of text files, where each new-line delimited line in a text file represents a row in the table. The system may also generate headers and a table describing the topology of the graph, and another table describing attributes of edges.

Graph Pruning

Figure 2:
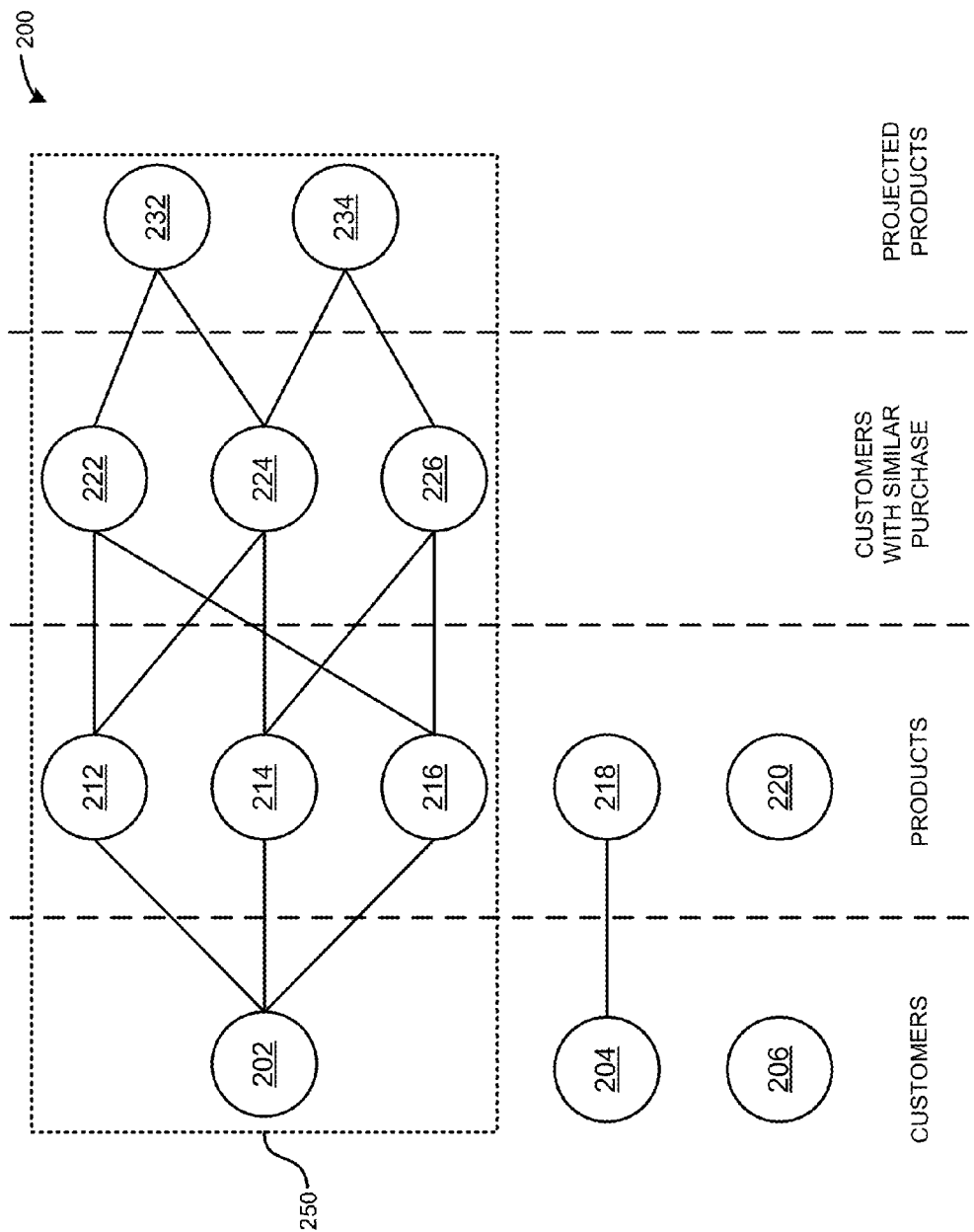
FIG. 2 illustrates an exemplary graph pruning based on a minimum graph traversal threshold, in accordance with an embodiment of the present invention.

FIG. 2 illustrates an exemplary graph pruning based on a minimum graph traversal threshold, in accordance with an embodiment of the present invention. During operation, a graph translation system (e.g., graph translation software 114 in FIG. 1) extracts data from a data source and generates a representative graph 200. A graph analytics system (e.g., graph analytics application 108) extracts information of interest from graph 200. Examples of information of interest include but are not limited to, shopping preferences and/or recommendations, social media activities, medical referrals, and e-mail traffic patterns, using efficient data analysis.

In some embodiments, graph 200 represents retail customers and their respective purchases. A vertex in graph 200 can correspond to a customer (e.g., vertex 202) or a product purchased by a customer (e.g., vertex 212). An edge between vertices 202 and 212 indicates that the customer associated with vertex 202 has purchased the product associated with vertex 212. The graph analytics system analyzes graph 200 to determine the purchases made by other customers who also purchased the same item as a first customer. The system may then recommend an item to the first customer. Suppose that vertex 202 represents the first customer.

In some embodiments, a query for recommending a product to the first customer includes finding other customers which have purchased at least one product in common with first customer and identifying products these other customers have purchased. Based on graph 200, such a computation requires a minimum graph traversal of four vertices and three edges. The first traversal step is from vertex 202 to a set of vertices, comprising vertices 212, 214, and 216, representing the set of products that the first customer has purchased. A second step involves traversing from vertices 212, 214, and/or 216 to a set of vertices, comprising vertices 222, 224, and 226, which represent other customers who have purchased these purchased products. A third step is traversing from vertices 222, 224, and/or 226 to vertices 232 and 234 representing other purchases made by the other customers. By traversing these three steps in graph 200, the graph analytics system can identify the projected products which the first customer can potentially purchase. In this way, a query applied to graph 200 can determine projected products, wherein the minimum graph traversal threshold for the query is four vertices and/or three edges.

Traversing through connected components which have less than four vertices and/or three edges does not yield the information of interest from graph 200. As a result, traversing though the vertices and/or edges of these connected components increases processing time and memory requirement for the graph analytics system without producing the intended information of interest from the graph. Such connected components can include isolated vertices, such as vertex 206 representing a customer who has not made any purchase and vertex 220 representing a product which has not been purchased.

Connected components can also include a set of vertices and edges which does not meet the minimum graph traversal requirement. For example, a connected component can include vertex 204 which represents a customer who has purchased just one product represented by vertex 218. This connected component does not provide a graph traversal of four vertices and/or three edges. As a result, the graph analytics system can generate a new graph 250 by pruning out connected components comprising vertices 204, 206, 218, and 220. Pruned graph 250 can then be used to answer the query. The answer produces the same result as that of original graph 200 with faster processing and a lower memory requirement.

Isolated Vertex Identification Using Tables

Figure 3A:
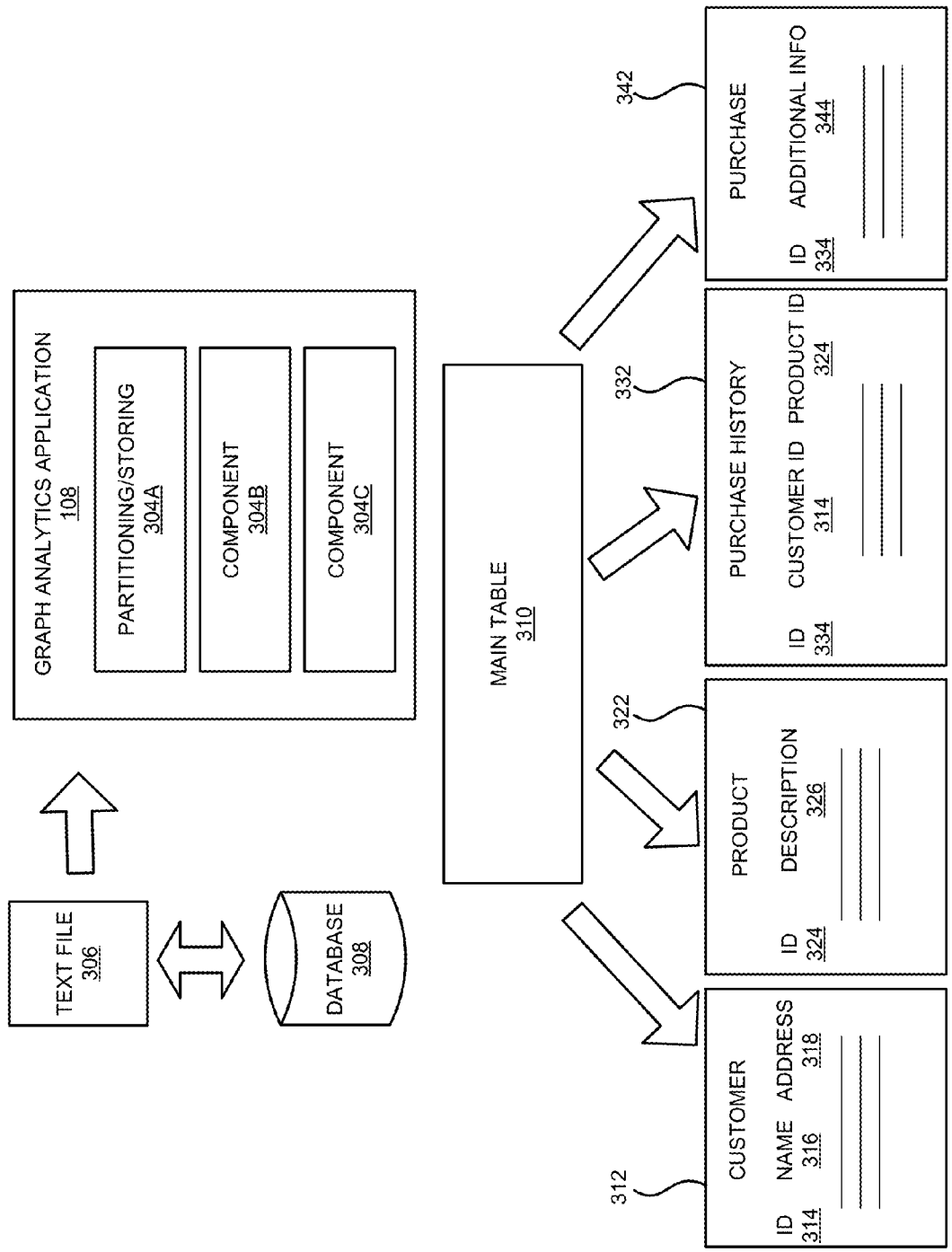
FIG. 3A illustrates an exemplary process of compiling data from tables to generate a graph and identify connected components, in accordance with an embodiment of the present invention.

FIG. 3A illustrates an exemplary process of compiling data from tables to generate a graph and identify connected components, in accordance with an embodiment of the present invention. FIG. 3A illustrates how system 100 in FIG. 1 may translate transaction data to a format suitable for Hipergraph. System 100 may extract data from a main table to form intermediate tables, associated headers, and a topology table and edge attributes table. System 100 may then write the intermediate tables, headers, and other tables to one or more text files.

As illustrated in FIG. 3A, graph analytics application 108 includes partitioning/storing component 304A and other components 304B-304C. Components 304B-304C may represent any number of components that facilitate analysis of an input graph. Graph analytics application 108 accepts as input a text file 306, which is stored in a database 308. Text file 306 contains data describing a graph representation generated from data retrieved from main table 310. Note that, depending on implementation, text file 306 may represent one or more text files.

System 100 may generate intermediate tables that include a customer table 312, a product table 322, a purchase history 332, and a purchase table 342. Customer table 212 may store data describing customers, such as customer ID 314, customer name 316, and customer address 318. Product table 214 may store data describing products that are available for purchase, such as product ID 324 and product description 326. Purchase history table 332 may store data describing customer purchases of products, although different implementations may also include other types of transactions in this or another transaction table. Purchase history table 332 can include a purchase ID 334, customer ID 314, and product ID 324. Purchase table 342 may store data describing purchase specific information, such as purchase ID 334 and purchase information 344. Purchase information 344 can include payment information and/or a shipping address.

System 100 retrieves data from main table 310, and stores the retrieved data in customer table 312, product table 322, purchase history table 332, and purchase table 342. Main table 310 may store data according to, for example, the relational model. Different retailers may store main tables that, depending on the domain, vary in structure or type of data stored, and may include any number of tables. In some embodiments, system 100 generates some headers for the intermediate tables and writes the intermediate tables and headers to text file 306. System 100 may also include other tables containing edge-related information for submission to graph analytics application 108.

Figure 3B:
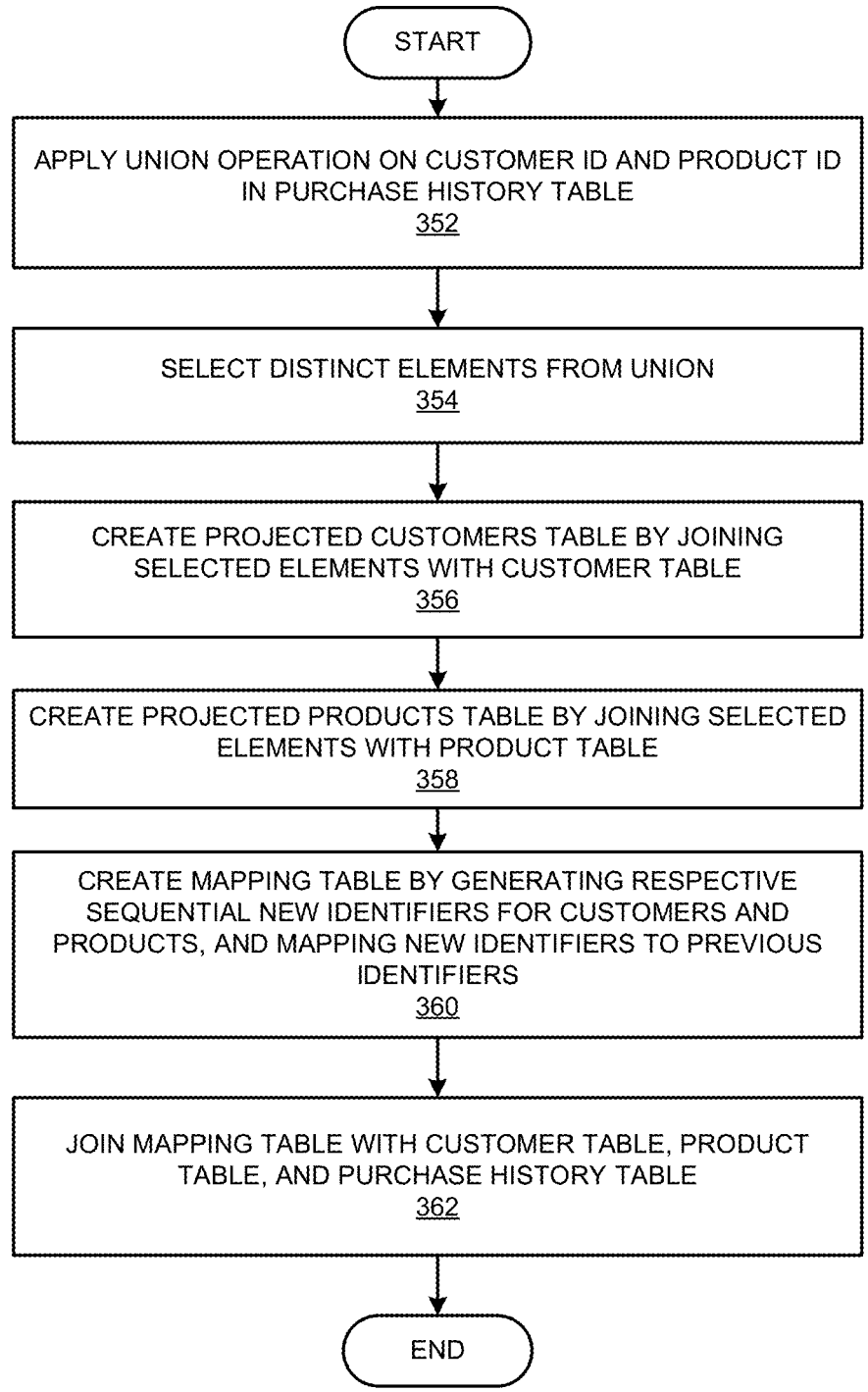
FIG. 3B presents a flowchart illustrating the process of identifying connected components based on tables, in accordance with an embodiment of the present invention.

FIG. 3B presents a flowchart illustrating the process of identifying connected components based on tables, in accordance with an embodiment of the present invention. This process can be used to prune out isolated vertices, or connected components of size one. In some embodiments, the process is automated by writing scripts in the HIVE query language to demonstrate the idea in the retail domain. Variations or alternatives to the current embodiment include implementation of the scripts in a different programming language such as any other declarative language like SQL. During operation, the process applies a union operation on the customer ID and product ID in a purchase history table (operation 352) and selects distinct elements from the union (operation 354). This can allow the process to find non-isolated vertices with degree greater than or equal to one.

The process then creates a projected customers table, which comprises only customers who have purchased at least one product, by joining the selected elements with customer table (operation 356). The process also creates a projected products table, which comprises only products that have been purchased by at least one customer, by joining the selected elements with product table (operation 358). The process creates a mapping table by generating respective sequential new identifiers for customers and products, and mapping the new identifiers to previous identifiers (operation 360). The new identifiers are generated sequentially to remove the potential gaps in the sequence of identifiers caused by the projection steps of operations 356 and/or 358. The process then joins mapping table with customer table, product table, and purchase history table (operation 362).

Identifying Connected Components and Graph Pruning

Figure 4A:
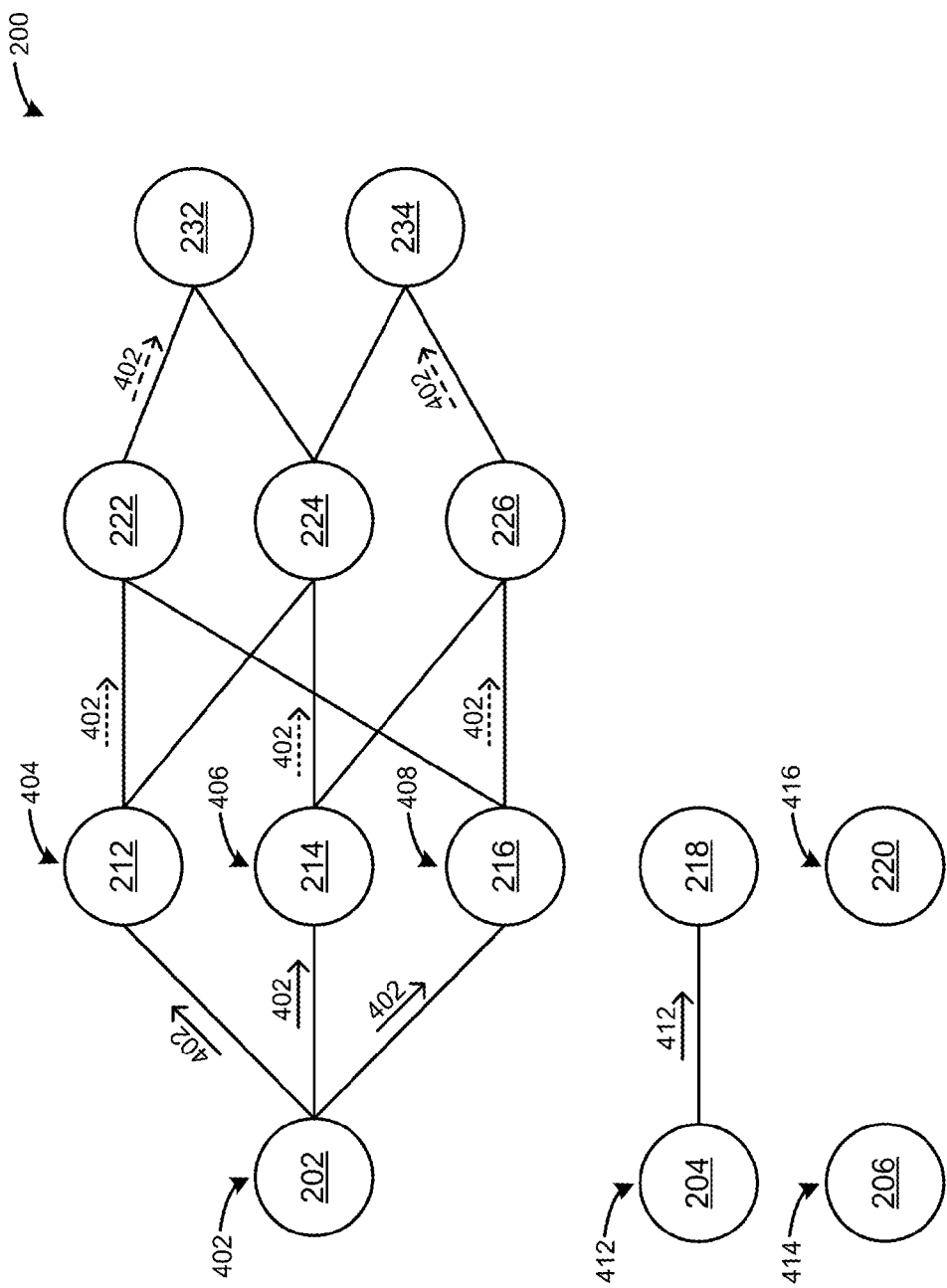
FIG. 4A illustrates an exemplary label propagation for identifying connected components, in accordance with an embodiment of the present invention.

FIG. 4A illustrates an exemplary label propagation for identifying connected components, in accordance with an embodiment of the present invention. In this example, labels 402, 404, 406, and 408 are associated with vertices 202, 212, 214, and 216, respectively, of graph 200. Similarly, other vertices of graph 200 are also associated with respective labels. A respective edge between a respective vertex pair can have the same weight. In some embodiments, the lowest (or highest) identifier value is used to determine the corresponding label propagation for edges with equal weights. Otherwise, label propagates between two vertices based on the weight of the edge between the vertices.

Suppose that among the neighbors of vertices 212, 214, and 216, vertex 202 has the smallest identifier. Under such a scenario, label 402 is propagated to vertices 212, 214, and 216. Hence, label 402 becomes associated with vertices 212, 214, and 216. Then label 402 becomes the smallest among the neighbors of vertices 222, 224, and 226 (denoted by dotted lines), and is propagated to and associated with vertices 222, 224, and 226. Similarly, label 402 is then propagated to and associated with vertices 232 and 234 (denoted by dashed lines).

Figure 4B:
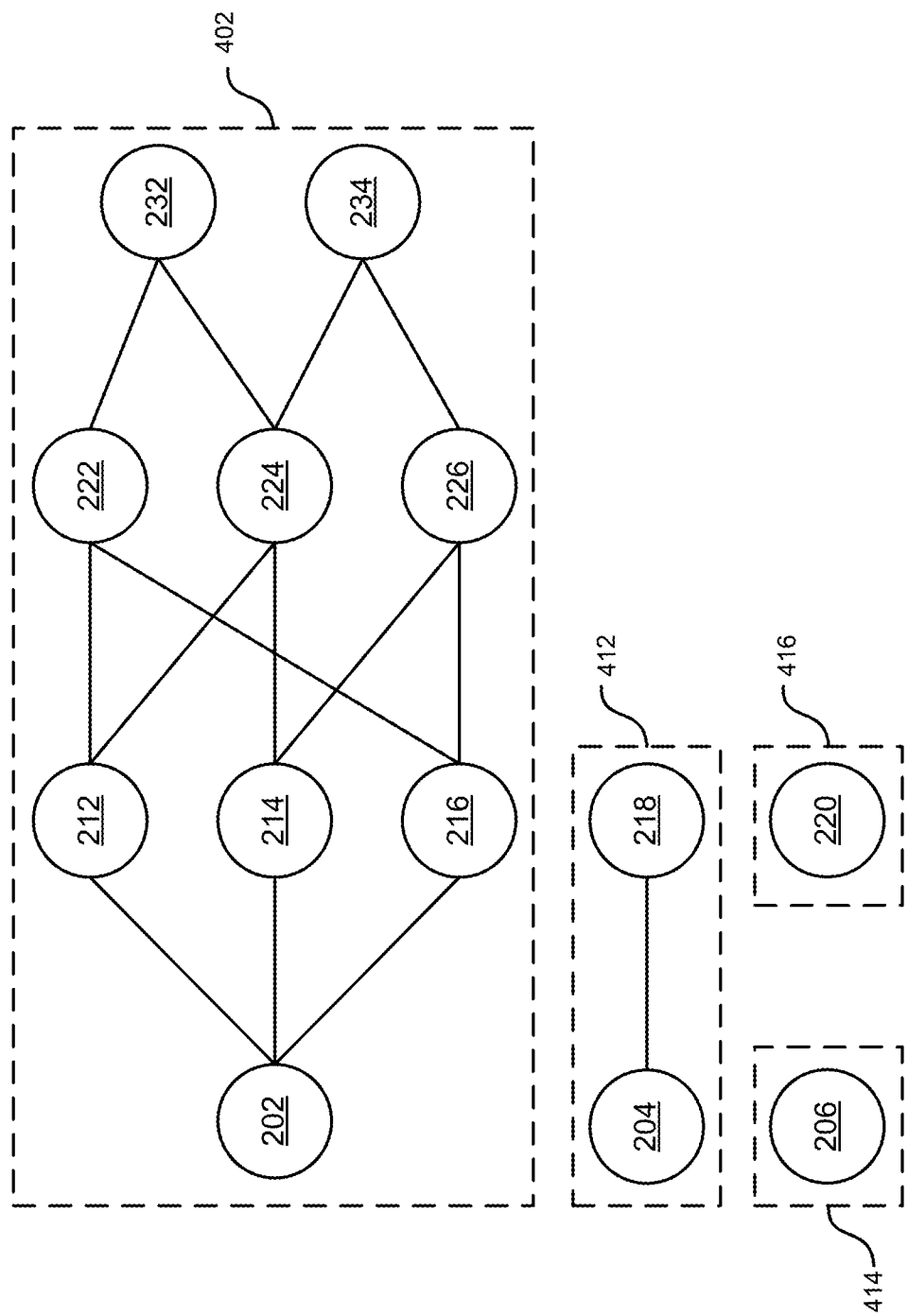
FIG. 4B illustrates an exemplary conformation of a minimum graph traversal threshold based on label propagation, in accordance with an embodiment of the present invention.

Furthermore, labels 412, 414, and 416 are associated with vertices 204, 206, and 220, respectively, of graph 200. Vertex 204 is in a connected component only comprising vertices 204 and 218. Hence, if label 212 is the smaller than the label of vertex 218, label 212 is propagated to vertex 218 from vertex 204 and becomes and associated with vertex 218. Vertices 206 and 220 are isolated vertices, hence labels 414 and 416 do not propagate. Based on the size of these connected components, where size indicates the number of vertices and/or edges in the connected component, an analytics system can check conformation of the connected components with the minimum graph traversal threshold. FIG. 4B illustrates an exemplary conformation of minimum graph traversal threshold based on label propagation, in accordance with an embodiment of the present invention. Once the labels are propagated in graph 200, as described in conjunction with FIG. 4A, vertices 202, 212, 214, 216, 222, 224, 226, 232, and 234 are associated with label 402.

Similarly, vertices 204 and 218 are associated with label 412, and vertices 206 and 220 are associated with labels 414 and 416, respectively. A graph analytics system can detect that label 412 is only associated with two vertices, which is less than four vertices, as indicated by the minimum graph traversal threshold for graph 200. Similarly, the system can detect that labels 414 and 416 are only associated with vertices 206 and 220, respectively. The graph analytics system thereby detects that vertices 204, 206, 218, and 220, and their corresponding edges can be pruned from graph 200 and generated pruned graph 250. Pruned graph 250 can then be used to answer the query. The answer produces the same result as that of original graph 200 with faster processing and a lower memory requirement. More details on algorithms identifying connected components in a graph are available in the publicly available literature, such as Tarjan, R. E. (1972), "Depth-first search and linear graph algorithms," SIAM Journal on Computing 1 (2): 146-160, the disclosure of which is incorporated by reference in its entirety herein.

Figure 5:
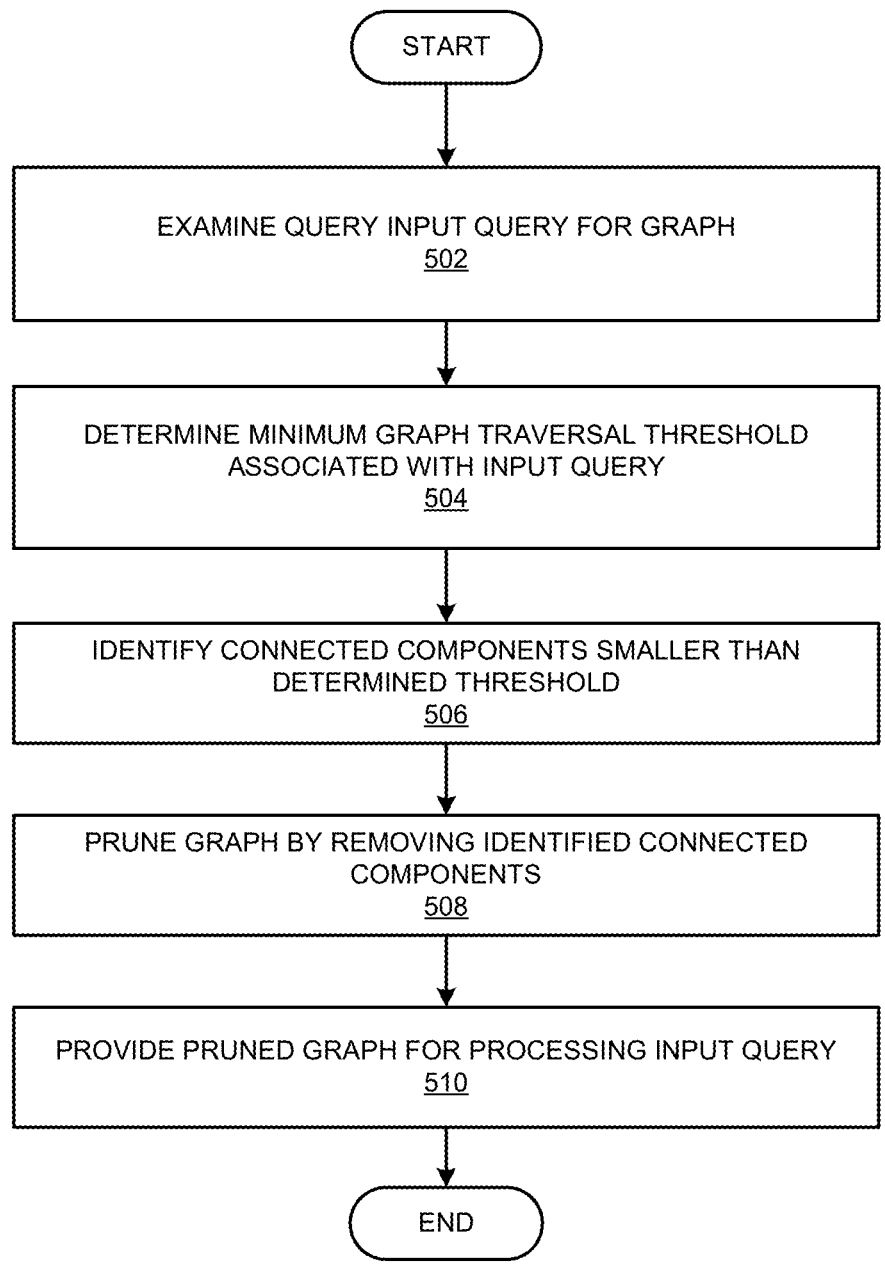
FIG. 5 presents a flowchart illustrating the graph pruning process, in accordance with an embodiment of the present invention.

FIG. 5 presents a flowchart illustrating the graph pruning process, in accordance with an embodiment of the present invention. During operation, the process examines an input query for a graph (operation 502) and determines a minimum graph traversal threshold associated with the input query (operation 504), as described in conjunction with FIG. 2. The process then identifies connected components smaller (e.g., having fewer vertices and/or edges) than the threshold (operation 506). Identifying connected components smaller than the threshold can be based on, but are not limited to, tabular operations, as described in conjunction with FIGS. 3A and 3B, and/or label propagation, as described in conjunction with FIGS. 4A and 4B. The process prunes the graph by removing identified connected components operation 508) and provides the pruned graph for processing the input query (operation 510) to a graph analytics system.

Exemplary System and Apparatus

Figure 6A:
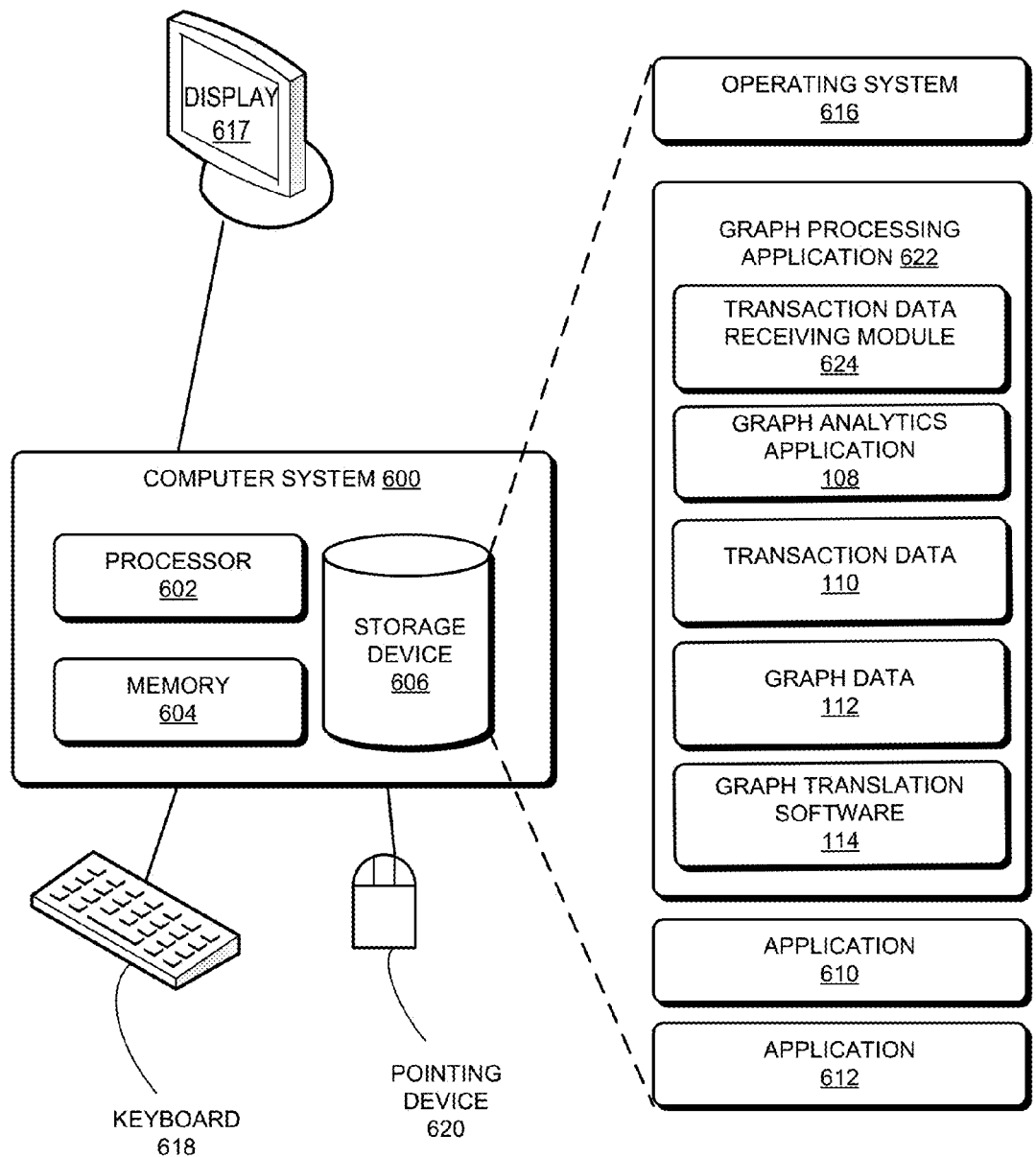
FIG. 6A illustrates an exemplary computer system for generating a graph and applying graph pruning, in accordance with an embodiment.

FIG. 6A illustrates an exemplary computer system for generating a graph and applying graph pruning, in accordance with an embodiment. An exemplary computer system 600 for pruning of graph data includes a processor 602, a memory 604, and a storage device 606. Storage device 606 stores a number of applications, such as applications 610 and 612 and operating system 616. Storage device 606 also stores graph processing application 622, which may include a transaction data receiving module 624, graph analytics application 108, transaction data 110, graph data 112, and graph translation software 114. During operation, one or more applications, such as graph processing application 622, are loaded from storage device 606 into memory 604 and then executed by processor 602. While executing the program, processor 602 performs the aforementioned functions. Computer and communication system 600 may be coupled to an optional display 617, keyboard 618, and pointing device 620.

Figure 6B:
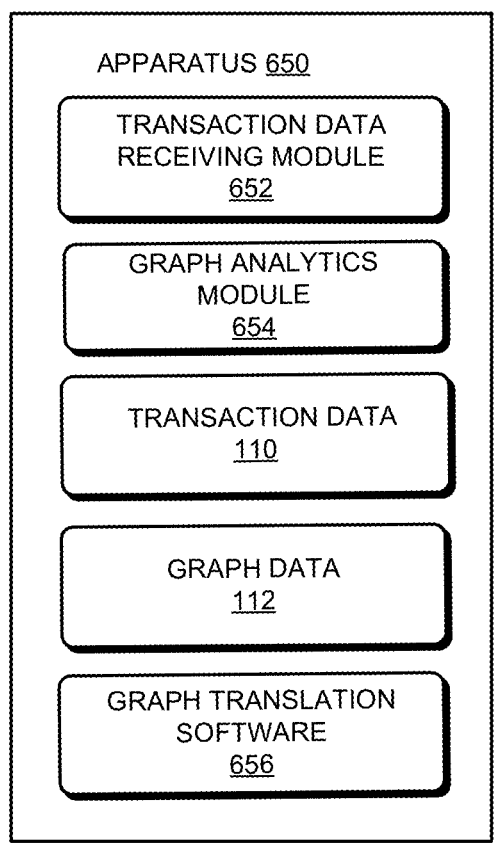
FIG. 6B illustrates an exemplary apparatus for generating a graph and applying graph pruning, in accordance with an embodiment.

FIG. 6B illustrates an exemplary apparatus for generating a graph and applying graph pruning, in accordance with an embodiment. An exemplary apparatus 650 can comprise a plurality of modules which may communicate with one another via a wired or wireless communication channel. Apparatus 650 may be realized using one or more integrated circuits, and may include fewer or more modules than those shown in FIG. 6B. Further, apparatus 650 may be integrated in a computer system, or realized as a separate device which is capable of communicating with other computer systems and/or devices. Specifically, apparatus 650 can comprise a transaction data receiving module 652, graph analytics module 654, transaction data 110, graph data 112, and graph translation software 656. Note that apparatus 650 may also include additional modules not depicted in FIG. 6B. In some embodiments, graph analytics module 654 performs the operations of graph analytics application 108.

In some embodiments, transaction data receiving module 652 can receive the transaction data, such as purchase data. Graph analytics module 652 (e.g., Hipergraph) receives the generated graph, prunes the generated graph based on a minimum graph traversal threshold, and extracts information of interest from the pruned graph to facilitate generating purchase recommendations. Graph data 112 can include the original graph data and the pruned graph data.

In some embodiments, using computer system 600 and/or apparatus 650 can involve one or more of: (i) examining the number of graph traversal steps there are in a query to determine a minimum graph traversal threshold, (ii) pruning the original graph by removing connected components smaller than the minimum graph traversal threshold of the query, (iii) generating a new sequence of vertex identifiers to remove gaps in the sequence of identifiers caused by the projection steps, as described in conjunction with FIG. 3B, and (iv) propagating labels to identify connected components of the graph.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for pruning a graph, comprising:
    storing in a storage device of a computer a data set comprising a plurality of data elements;
    determining, by the computer, a type and strength of relationship between a data element pair in the plurality of data elements;
    representing the type and strength of relationship as an edge between a vertex pair representing the data element pair in a graph;
    determining a minimum graph traversal threshold associated with an input query received by the computer for the graph, wherein the minimum graph traversal threshold indicates a minimum number of traversal steps needed for the input query in the graph;
    identifying that a number of traversal steps for a first connected component in the graph is greater than or equal to the minimum graph traversal threshold, and wherein a connected component includes a set of one or more vertices, which are coupled to each other via edges and are not coupled to a vertex outside of the set;
    identifying that a number of traversal steps for a second connected component in the graph is smaller than the minimum graph traversal threshold;
    generating a second graph comprising the first connected component by pruning the second connected component from the graph; and
    processing the input query on the second graph to extract information of interest from the data set.

2. The method of claim 1, wherein the set of one or more vertices in the connected component includes one or more of:
    an isolated vertex; and
    a set of vertices coupled to each other via one or more edges.

3. The method of claim 1, wherein a respective element in the data set is stored on one or more tables in the storage device, wherein the element is identified based on a first identifier; and wherein identifying that a number of traversal steps for the second connected component is smaller than the minimum graph traversal threshold comprises one or more tabular operations performed on the one or more tables.

4. The method of claim 3, further comprising, in response to identifying an element in the data set not to be represented by a connected component in the graph, generating a second identifier for the element.

5. The method of claim 4, further comprising mapping the second identifier to the first identifier in a mapping table in the storage device.

6. The method of claim 1, further comprising:
assigning a label to a respective vertex in the graph;
propagating a label from a first vertex to a second vertex; and
identifying a set of vertices associated with the same label.

7. The method of claim 6, wherein identifying that a number of traversal steps for the second connected component is smaller than the minimum graph traversal threshold comprises determining whether a size of the identified set of vertices is smaller than the minimum graph traversal threshold.

8. The method of claim 1, wherein an element in the data set indicates one or more of:
a customer of a store; and
a product of the store; and
wherein the type of relationship indicates whether the customer has purchased the product.

9. A non-transitory computer-readable storage medium storing instructions that when executed by a computer cause the computer to perform a method for graph pruning, comprising:
storing in a storage device of a computer a data set comprising a plurality of data elements;
determining, by the computer, a type and strength of relationship between a data element pair in the plurality of data elements;
representing the type and strength of relationship as an edge between a vertex pair representing the data element pair in a graph;
determining a minimum graph traversal threshold associated with an input query received by the computer for the graph, wherein the minimum graph traversal threshold indicates a minimum number of traversal steps needed for the input query in the graph;
identifying that a number of traversal steps for a first connected component in the graph is greater than or equal to the minimum graph traversal threshold, and wherein a connected component includes a set of one or more vertices, which are coupled to each other via edges and are not couple to a vertex outside of the set;
identifying that a number of traversal steps for a second connected component in the graph is smaller than the minimum graph traversal threshold;
generating a second graph comprising the first connected component by pruning the second connected component from the graph; and
processing the input query on the second graph to extract information of interest from the data set.

10. The non-transitory computer-readable storage medium of claim 9, wherein the set of one or more vertices in the connected component includes one or more of:
an isolated vertex; and
a set of vertices coupled to each other via one or more edges.

11. The non-transitory computer-readable storage medium of claim 9, wherein a respective element in the data set is stored on one or more tables in the storage device, wherein the element is identified based on a first identifier; and
wherein identifying that a number of traversal steps for the second connected component is smaller than the minimum graph traversal threshold comprises one or more tabular operations performed on the one or more tables.

12. The non-transitory computer-readable storage medium of claim 11, wherein the method further comprises, in response to identifying an element in the data set not to be represented by a connected component in the graph, generating a second identifier for the element.

13. The non-transitory computer-readable storage medium of claim 12, wherein the method further comprises mapping the second identifier to the first identifier in a mapping table in the storage device.

14. The non-transitory computer-readable storage medium of claim 9, wherein the method further comprises:
assigning a label to a respective vertex in the graph;
propagating a label from a first vertex to a second vertex; and
identifying a set of vertices associated with the same label.

15. The non-transitory computer-readable storage medium of claim 14, wherein identifying that a number of traversal steps for the second connected component is smaller than the minimum graph traversal threshold comprises determining whether a size of the identified set of vertices is smaller than the minimum graph traversal threshold.

16. The non-transitory computer-readable storage medium of claim 9, wherein an element in the data set indicates one or more of:
a customer of a store; and
a product of the store; and
wherein the type of relationship indicates whether the customer has purchased the product.

17. A computing system for graph pruning, the system comprising:
one or more processors;
a storage device;
a computer-readable medium coupled to the one or more processors having instructions stored thereon that, when executed by the one or more processors, cause the one or more processors to perform operations comprising:
storing in the storage device a data set comprising a plurality of data elements;
determining, by the computing system, a type and strength of relationship between a data element pair in the plurality of data elements;
representing the type and strength of relationship as an edge between a vertex pair representing the data element pair in a graph;
determining a minimum graph traversal threshold associated with an input query received by the computer for the graph, wherein the minimum graph traversal threshold indicates a minimum number of traversal steps needed for the input query in the graph;
identifying that a number of traversal steps for a first connected component in the graph is greater than or equal to a minimum graph traversal threshold, and wherein a connected component includes a set of one or more vertices, which are couple to each other via edges and are not couple to a vertex outside of the set;

identifying that a number of traversal steps for a second connected component in the graph is smaller than the minimum graph traversal threshold;

generating a second graph comprising the first connected component by pruning the connected component from the graph; and processing the input query on the second graph to extract information of interest from the data set.

18. The computing system of claim 17, wherein a respective element in the data set is stored on one or more tables in the storage device, wherein the element is identified based on a first identifier; and wherein identifying that a number of traversal steps for the second connected component is smaller than the minimum graph traversal threshold comprises one or more tabular operations performed on the one or more tables.

19. The computing system of claim 18, wherein the operations further comprises:

in response to identifying an element in the data set not to be represented by a connected component in the graph, generating a second identifier for the element; and mapping the second identifier to the first identifier in a mapping table in the storage device.

20. The computing system of claim 17, wherein the operations further comprises:

assigning a label to a respective vertex in the graph;

propagating a label from a first vertex to a second vertex; and identifying a set of vertices associated with the same label; and wherein identifying that a number of traversal steps for the second connected components is smaller than the minimum graph traversal threshold comprises determining whether a size of the identified set of vertices is smaller than the minimum graph traversal threshold.

* * * * *